(12) United States Patent
Jones et al.

(10) Patent No.: US 7,823,956 B2
(45) Date of Patent: Nov. 2, 2010

(54) REAR BAG COVER AND METHOD OF ATTACHMENT BY BRACKETS

(75) Inventors: Marion Lee Jones, Augusta, GA (US); Dorian Thurston True, Augusta, GA (US); Earl Thomas Saxon, North Augusta, SC (US)

(73) Assignee: Carolina Covertech, Inc., North Augusta, SC (US)

( * ) Notice: Subject to any disclaimer, the term of this patent is extended or adjusted under 35 U.S.C. 154(b) by 0 days.

(21) Appl. No.: 12/277,477

(22) Filed: Nov. 25, 2008

(65) Prior Publication Data
US 2009/0140539 A1 Jun. 4, 2009

Related U.S. Application Data

(60) Provisional application No. 60/991,135, filed on Nov. 29, 2007.

(51) Int. Cl.
*B60P 7/04* (2006.01)
(52) U.S. Cl. .............................. 296/100.06; 296/100.14
(58) Field of Classification Search ................................
296/100.06–100.09, 100.11, 100.12, 100.14, 296/100.16, 100.17, 100.18, 136.01, 136.04, 296/136.1, 136.11–136.13
See application file for complete search history.

(56) References Cited

U.S. PATENT DOCUMENTS

| 179,392 A | 7/1876 | Ayres |
| 194,061 A | 8/1877 | Thompson |
| 208,564 A | 10/1878 | Bowers |
| 621,615 A | 3/1899 | McConnell |
| 1,360,407 A | 11/1920 | Hughes et al. |
| 2,598,940 A | 6/1952 | Robie |
| 3,152,707 A | 10/1964 | Rey |
| 3,371,672 A | 3/1968 | Hale et al. |
| 3,908,777 A | 9/1975 | Davidson |
| 4,008,874 A | 2/1977 | Conway, Jr. |
| 4,023,838 A * | 5/1977 | Sabec .......................... 296/102 |
| 4,332,415 A | 6/1982 | Williams |

(Continued)

FOREIGN PATENT DOCUMENTS

DE   3517967   11/1985

(Continued)

*Primary Examiner*—Glenn Dayoan
*Assistant Examiner*—Gregory Blankenship
(74) *Attorney, Agent, or Firm*—Catherine E. Hart; Kilpatrick Stockton LLP

(57) ABSTRACT

The invention is an apparatus and method for attaching a cover to a golf cart by brackets and the brackets themselves. The tension supplied by the brackets may be the only mechanism by which the cover mounts to the golf cart. Brackets are preferably configured for attachment to the roof of the golf cart. The apparatus may include brackets for mounting the cover to the roof, a stationary main frame member, a movable frame member, and a cover. Brackets receive the stationary frame member. The movable frame member is operatively secured to the stationary main frame member, and configured to pivotably rotate over a portion of the rear compartment of the golf cart. The cover is configured for attachment to the movable frame member so that when the movable frame member rotates over a portion of the rear compartment of the golf cart, the cover covers a portion of the rear compartment of the golf cart.

20 Claims, 5 Drawing Sheets

U.S. PATENT DOCUMENTS

| | | | | |
|---|---|---|---|---|
| 4,469,114 | A | 9/1984 | Kelley et al. | |
| 4,621,859 | A | 11/1986 | Spicher et al. | |
| 4,641,879 | A | 2/1987 | Kassai | |
| 4,681,362 | A | 7/1987 | Taylor | |
| 4,773,694 | A | 9/1988 | Gerber | |
| 4,830,037 | A * | 5/1989 | Held | 135/88.09 |
| 4,846,524 | A | 7/1989 | Gerber | |
| 6,216,714 | B1 | 4/2001 | Tucker | |
| 6,220,647 | B1 * | 4/2001 | Winkler | 296/100.14 |
| 6,227,217 | B1 | 5/2001 | Peta | |
| 6,227,603 | B1 * | 5/2001 | Brock | 296/100.14 |
| 6,416,109 | B1 | 7/2002 | Tyrer et al. | |
| 6,471,281 | B1 | 10/2002 | Tyrer et al. | |
| 6,481,780 | B2 * | 11/2002 | Dolan et al. | 296/100.18 |
| 6,547,312 | B2 * | 4/2003 | Winkler | 296/100.14 |
| 6,601,904 | B2 * | 8/2003 | Winkler | 296/100.14 |
| 6,663,161 | B1 * | 12/2003 | Tyrer | 296/100.11 |
| 6,663,162 | B1 | 12/2003 | Tyrer | |
| 6,805,396 | B2 * | 10/2004 | True et al. | 296/100.14 |
| 6,953,216 | B2 | 10/2005 | Held | |
| 6,979,044 | B2 | 12/2005 | Tyrer | |
| 7,093,883 | B2 | 8/2006 | Tyrer | |
| 7,100,662 | B2 * | 9/2006 | Nation | 160/56 |
| 7,175,224 | B2 | 2/2007 | Held | |
| 7,322,634 | B2 | 1/2008 | Held | |
| 7,354,092 | B2 | 4/2008 | Showalter et al. | |
| 7,387,133 | B1 | 6/2008 | True et al. | |
| 7,448,666 | B2 | 11/2008 | Tyrer | |
| 2001/0039960 | A1 | 11/2001 | Shugar et al. | |
| 2002/0041106 | A1 * | 4/2002 | Winkler | 296/70 |
| 2003/0183262 | A1 * | 10/2003 | Tyrer | 135/88.09 |
| 2004/0026955 | A1 * | 2/2004 | Dolan et al. | 296/100.01 |
| 2004/0027373 | A1 | 2/2004 | Jacquot et al. | |
| 2008/0174143 | A1 * | 7/2008 | Showalter | 296/100.14 |

FOREIGN PATENT DOCUMENTS

JP     11216215     8/1999

\* cited by examiner

REAR BAG COVER AND METHOD OF ATTACHMENT BY BRACKETS

CROSS REFERENCE TO RELATED APPLICATIONS

This application claims priority to U.S. Provisional Application Ser. No. 60/991,135, filed Nov. 29, 2007, the entire contents of which are hereby incorporated by reference.

FIELD OF THE INVENTION

The invention relates generally to golfing accessories, and relates more particularly to brackets that may attach a protective cover or other accessories to a golf cart and to a protective cover that may be attached to the roof of a golf cart by brackets.

BACKGROUND

Golfing is a popular pastime for many people of all ages. Golfers occasionally use a motorized golf cart to transport their golf equipment while playing golf. Many golf carts include a rear compartment into which a golf bag and clubs can be positioned during the use of a cart. Commonly, the rear compartment is uncovered, even if the cart includes a top section for covering the seating compartment of the cart. Hence, the golf bag and clubs positioned in the rear compartment of the cart are unprotected from weather, elements, or precipitation, such as rainfall. A golfer's grip on his clubs, and his game, can be adversely affected if the grips of his clubs become wet. Thus, it is desirable to protect a golfer's bag and clubs from weather precipitation while the bag and clubs are positioned in the rear compartment of the golf cart.

Golf bag covers may be used to provide protection to a golf bag and golf clubs positioned in a rear compartment of a golf cart. There are several known methods of attaching golf bag covers to golf carts, including screwing them to the support frame, bolting them to the support frame, and screwing them to the roof. These methods of attachment require a modification to the golf cart; i.e., screw holes for the insertion of screws and holes for the acceptance of bolts. Attaching golf bag covers to golf carts according to prior methods, accordingly, resulted in a permanent marring or modification of the golf cart.

Furthermore, it was necessary to use tools to attach conventional golf bag covers to a golf cart. Users were not able to mount and/or remove these golf bag covers without special tooling such as a screwdriver. The use of tools and other devices required an extended length of time to mount and/or remove a golf bag cover.

At least one type of cover attaches to conventional golf carts and provides protection to a golf bag and clubs positioned in a rear compartment of the golf cart. However, a user's access to other accessories in the rear compartment of the golf cart can be hindered by the positioning of the cover with respect to the cart. Thus, there is a need in the art for a golf cart cover that does not interfere with a user's access to the rear compartment of the cart, yet provides a cover for the rear compartment. Moreover, there is a need for a golf cart cover that provides increased range of access to the contents of the rear of the golf cart. Previously, golf cart covers attached to the cart at low positions, such as near the bottom of the rear support members or at the bag support, impeded access to, or precluded storage of, tall or unwieldy contents such as long clubs or coolers.

SUMMARY

The present invention includes a cover device and method that does not interfere with a user's access to the rear compartment of the cart, yet provides cover for the cart's rear compartment. The invention also includes an attachment to a golf cart that allows greater access to the rear of the golf cart than previous cart covers.

The golf bag cover of the present invention may be mounted to a golf cart without the need for marring or modifying the cart itself. The golf bag cover of the present invention utilizes removable attachment means, such as brackets. Tension or pressure created by the brackets holds the cover in place on the cart. The brackets are attached to the cart at the golf cart roof and may include a snap-fit void or other mechanisms for the attachment of the golf bag cover to the brackets. Because different golf carts have different shapes and structures, different bracket shapes, angles, and sizes are included in the invention. Additionally, brackets may be used to attach any variety of accessories commonly used in the game of golf, including tools, accessories, visors, etc.

Attachment mechanisms and means using a single or multiple brackets are envisioned. Brackets may snap onto the roof of a golf cart and be held in place by the force created by the bracket itself. Additionally, should the user wish to secure the golf cart cover in a permanent manner, the brackets may be pre-drilled for optional placement of screws at the user's request or additional attachment mechanisms may more permanently attach the golf cart cover to the golf cart.

Attachment by brackets to the roof of the golf cart as disclosed by the present invention allows the cover to be attached to the cart at a high point of attachment with respect to the cart as a whole so that the golf bag cover does not impede access to long golf clubs or coolers located in the rear compartment of the golf cart. Attachment by brackets at the roof also allows the golf cart cover to be removably affixed to the golf cart, without necessarily marring the cart itself.

The present invention is an apparatus for covering the rear portion of a golf cart and its method of use. The apparatus is configured to be mounted to the roof of a golf cart by brackets. The apparatus may include mounting brackets, a stationary main frame member a movable frame member, and a cover. The stationary main frame member is suitable for receipt by the brackets, which are mounted to the roof of the golf cart. The movable frame member is operatively secured to the stationary main frame member, and configured to pivotably rotate over a portion of the rear compartment of the golf cart. The cover is configured for attachment to the movable frame member so that when the movable frame member rotates over a portion of the rear compartment of the golf cart, the cover covers a portion of the rear compartment of the golf cart.

More particularly described, the invention includes a stationary main frame connected to the golf cart by a one or more brackets mounted to the roof of the golf cart. Brackets of numerous sizes and shapes are envisioned. In one embodiment, the shape of the bracket closely matches the shape of the roof's profile. The stationary main frame preferably defines a U-shape assembly with a pair of arm tubes and a connecting tube between the arm tubes. The stationary main frame tubes may be formed integrally or as separate pieces. The stationary frame connecting tube is attached to the golf cart by means of the brackets. The stationary main frame may be molded into the brackets, may clip onto a portion of the brackets or may be retained by the brackets in other ways known to those of ordinary skill in the art. The pair of stationary frame arms preferably extend downwardly of the connecting tube. A movable frame connects to the stationary main frame. The movable frame includes a U-shape piece with two arm bars. At least one arm of the movable frame connects to the stationary main frame. A connecting portion of the movable frame preferably connects the two arms so that the movable frame pivots away from the stationary main frame to support a cover.

In one aspect of the invention, the invention is a method for covering a rear compartment of a golf cart having a roof. The method includes mounting brackets to the rear edge of the roof of the golf cart. A stationary main frame member, if not previously mounted to the brackets, is then attached to the brackets. The method further includes mounting a movable frame member to the stationary main frame member, the movable frame member configured to pivot toward the rear compartment of the golf cart. The method includes extending a flexible cover about the movable frame member so that when the movable frame member is moved, a portion of the flexible cover is extended from a first unopened position to a second covered position.

In yet another aspect of the invention, the invention includes a method for extending a cover from the roof of a golf cart. The method includes moving a movable frame member that is pivotably secured to a stationary main frame member. The movable frame depends from and pivots from a point that is below the uppermost portion of the movable frame. The movable frame defines a first unopened position and a second open position. In the unopened position, the movable frame is preferably collapsed. In the opened position, the movable frame is extended from the upper portion of the golf cart. The stationary main frame member is configured to mount to brackets which are attached to the roof of the golf cart, and the movable frame member is configured to attach to the stationary main frame member.

DETAILED DESCRIPTION

Figure 1:
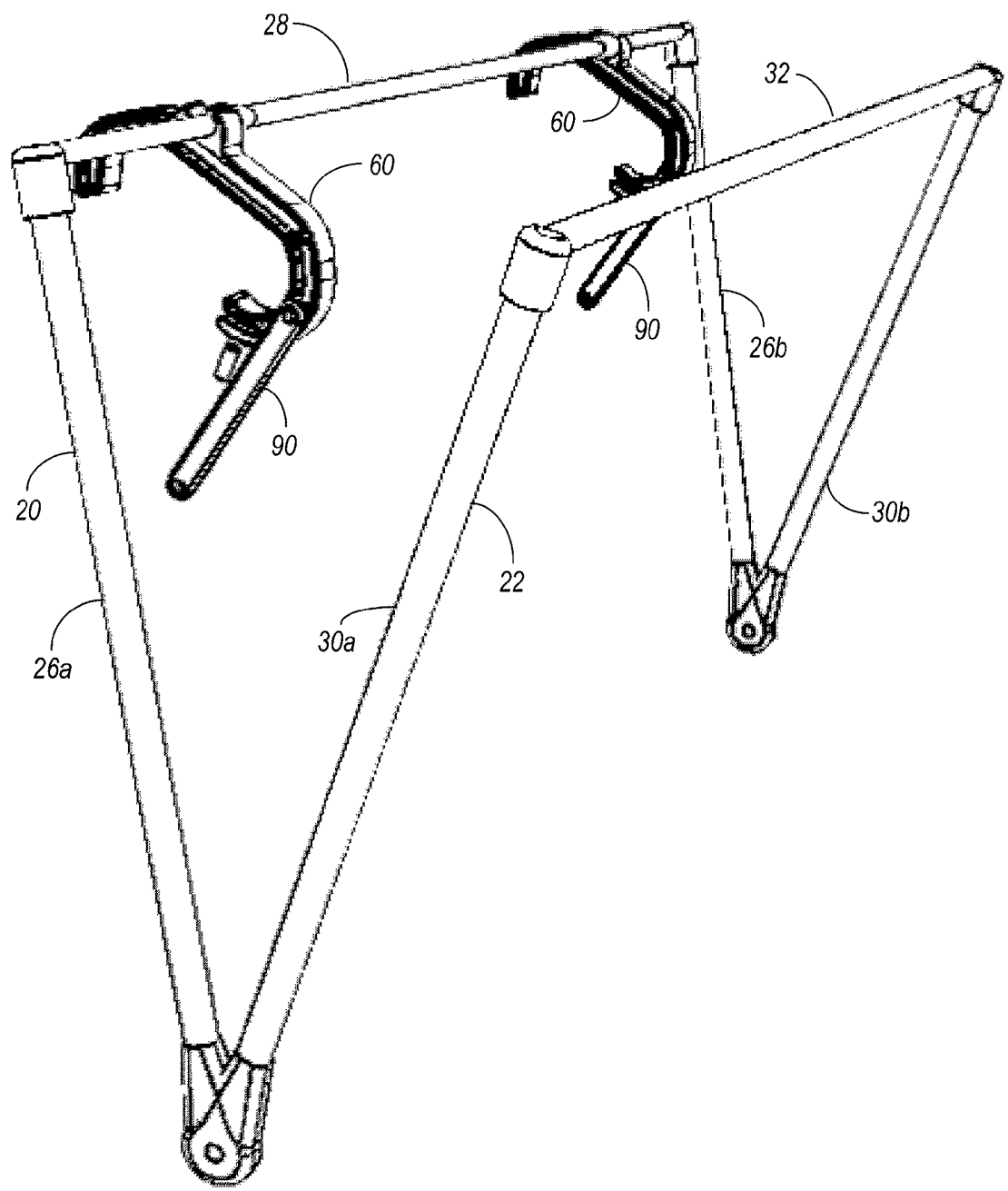
FIG. 1 is a perspective view of a golf cart cover device in accordance with one embodiment of the present invention, including a stationary main frame member, a movable frame member, and brackets.
Figure 2:
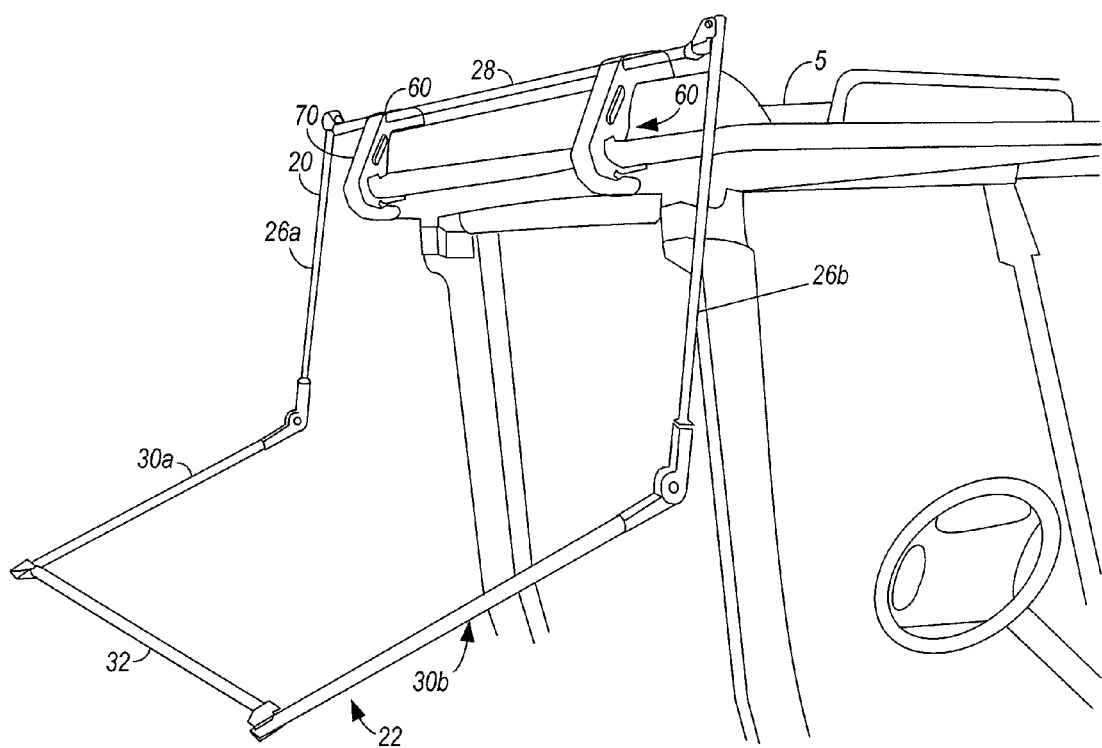
FIG. 2 is a perspective view showing an embodiment of the present invention connected to the roof of a golf cart.

Turning now to the drawings in greater detail, where numerals represent detailed features of the invention, FIG. 1 illustrates an exploded perspective view of one embodiment of the present invention view including a stationary main frame 20 and a movable frame 22. A cover (not shown) may also be included. FIG. 2 illustrates a perspective view of a golf cart roof 5 and a perspective view of one embodiment of the invention that can be connected to the roof 5 of the golf cart by brackets 60. In one aspect of the present invention, a cover for the rear bag compartment of a golf cart includes a stationary main frame 20, a movable frame 22, and a cover (not shown). The stationary main frame 20 connects to the roof 5 of the golf cart by brackets 60. Brackets 60 may be shaped to generally correspond to the profile 70 of the roof 5. Brackets 60 may attach to the roof 5 by tension, clamps, snap-fit, pressure, or other known methods of attachment. Stationary main frame 20 may connect be integrated with brackets 60, may slide into voids 80 in brackets, may clip into voids 80 in brackets, or may attach to brackets by any other method. Additionally, brackets 60 may be used to attach any variety of accessories commonly used in the game of golf, including but not limited to tools, accessories, visors, canopies, advertising banners, pin placement information cards, tournament score card holder placards, pennant flags, windsocks, etc., to any side, front or rear of the golf cart. In addition, brackets 60 may accept other portions of a golf cart attachment, including but not limited to the cover strip disclosed in U.S. Pat. No. 7,287,133.

A cover connects to the movable frame 22, and the movable frame 22 connects to the stationary main frame 20 so that both the movable frame 22 and cover 24 can pivot with respect to the stationary main frame 20 and the motorized golf cart.

A stationary main frame 20 can be a square-"U-shaped" frame made from iron, aluminum or similar type of metal tubing. The stationary main frame 20, or portions of it, may be made of a round or oval ⅜" glass filled injection molded or extruded plastic tubing. The stationary main frame 20 includes a pair of arm tubes 26a,b and a connecting tube 28 disposed between the arm tubes 26a,b. The connecting tube 28 is substantially straight along its length and may be oval in profile. Typically, the connecting tube 28 is oriented in a substantially horizontal position, roughly parallel to the rear edge of the roof 5 of the golf cart. The connecting tube 28 is connected to the brackets 60. Connecting tube 28 may be integrated with the brackets 60 or may be connected to brackets 60 by sliding into voids 80, by snapping into voids 80 or by other methods of attachment. When the connecting tube 28 is secured to the brackets 25, the stationary main frame 20 remains in a relatively fixed position with the respect to the golf cart. Connecting tube 28 that is oval in profile prevents the stationary main frame 20 from rotating once it is connected to brackets 60. In one embodiment of the invention, brackets 60 are the only method of attachment of the golf cart cover to the roof 5. In one embodiment of this aspect, the brackets 60 hold the stationary main frame 20 to the roof through tension alone. In this embodiment, the cover is attached to the cart without the need for drilling, marring, or otherwise modifying the roof or other portion of the golf cart. In another embodiment of the invention, other methods of attachments, such as stabilizing bars 90, are also included. For example, stabilizing bars 90 may connect the brackets 60 to a location on the golf cart, such as to the roof 5 or to the rear support frame. In this embodiment, screws or some other form of permanent attachment may be used to secure the stabilizing bars 90 to the cart. Both brackets 60 and stabilizing bars 90 may be drilled with holes for the acceptance of screws. In yet another embodiment of the invention, bars, clamps, or other methods of attachment (without or without screws or other methods of permanent attachment), in combination with brackets 60, connect to the stationary main frame 20 to the golf cart.

The movable frame 22 includes two arm bars 30a,b and a connecting bar 32 disposed between each arm bar 30a,b. Each arm bar 30a,b is substantially straight along its length. The connecting bar 32 is substantially straight along its length. Typically, the connecting bar 32 is oriented in a substantially horizontal position, and is substantially parallel with the connecting tube 28 of the stationary main frame 20. When the connecting bar 32 is oriented in such fashion, the arm bars 30a,b extend away from opposing ends of the connecting bar 32 so that each arm bar 30a,b can pivotably connect with an open end of a corresponding arm tube 26a,b. The arm bars 30a,b can then be connected to the stationary main frame 20.

Holes machined through the open ends of the arm bars 30*a,b* and through the open ends of the corresponding arm tube 26*a,b* may be sized for connecting bolts or hardware to pivotably connect the arm bars 30*a,b* to a corresponding arm tube 26*a,b*. Arm bars 30*a,b* may also connect to arm tubs 26*a,b* by other methods of attachment. When the arm bars 30*a,b* are secured to the arm tubes 26*a,b*, the movable frame 22 can pivot with respect to the stationary main frame 20.

The cover can be made of collapsible or flexible material such as plastic, vinyl, canvas, or other similar types of material. The cover may be attached to the stationary main frame 20 or brackets 60 by snaps, Velcro™, or by other methods of attachment. The cover can be stretched between the connecting tube 28 and the movable frame 22 so that at least one portion of the cover remains stationary with respect to the stationary main frame 20, and another portion of the cover 24 can pivot or move concurrently with the movable frame 22 when the movable frame 22 pivots with respect to the stationary main frame 20.

Typically, the cover is made from canvas panels and has a clear plastic window in one or more of the canvas panels. For example, the cover can be a four-panel, box-shaped cover with a clear plastic window in the rear panel. Since the box-shaped cover is manufactured from a fabric-type material, the cover remains flexible when the movable frame 22 pivots with respect with the stationary main frame 20.

Initially, when the attachment is not in use, the movable frame 22 can be pivoted upward so that the connecting bar 32 of the movable frame 22 is adjacent to the connecting tube 28 of the stationary main frame 20. Thus, when the attachment is not in use, the cover is not deployed over the rear compartment of the golf cart, and when positioned in the non-operative upright position, allows a user such as a golfer to access the rear bag compartment of the golf cart.

When the movable frame 22 is pivoted downward from the upper portion of the rear support frame 12 of the golf cart, the cover cooperates with the movable frame 22 and extends downward and over the rear compartment of the golf cart. Typically, the shape or design of the cover limits the downward movement of the movable frame 22 to the intersection between the top panel and the rear panel of the cover. Thus, when deployed, the cover provides protection from the weather and elements for objects such as golf clubs and golf bags stored in the rear compartment of the golf cart. A user such as a person sitting in the front portion of the golf cart can still access the rear compartment of the golf cart even when the rear bag cover is in a deployed position. Because the cover of the present invention attaches at the roof 5 of the golf cart, users sill have substantial access to the rear of the golf cart and large items such as tall golf clubs and coolers may be freely accessed.

Figure 3:
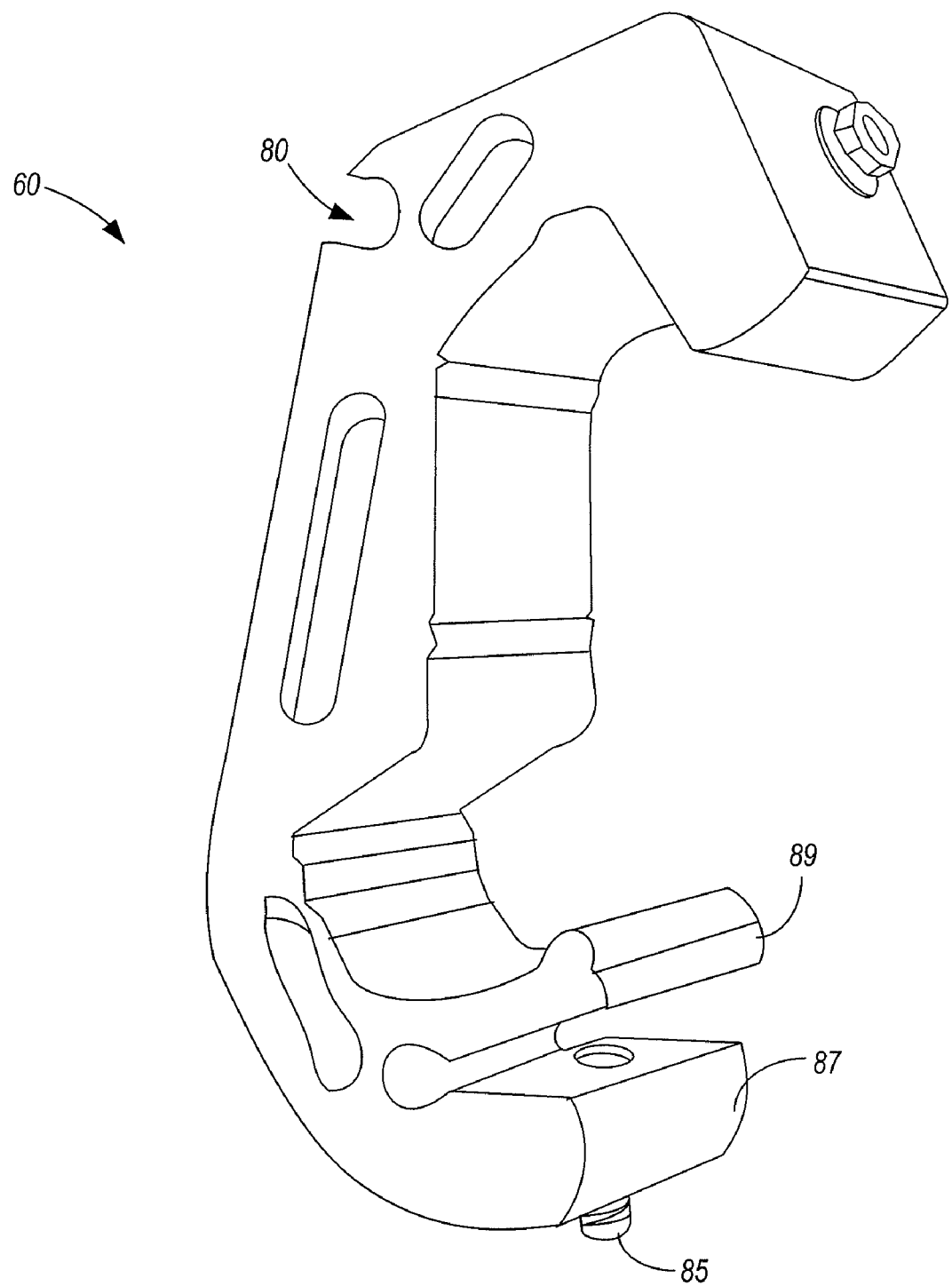
FIG. 3 is a perspective view showing a bracket according to one embodiment of the invention.
Figure 4:
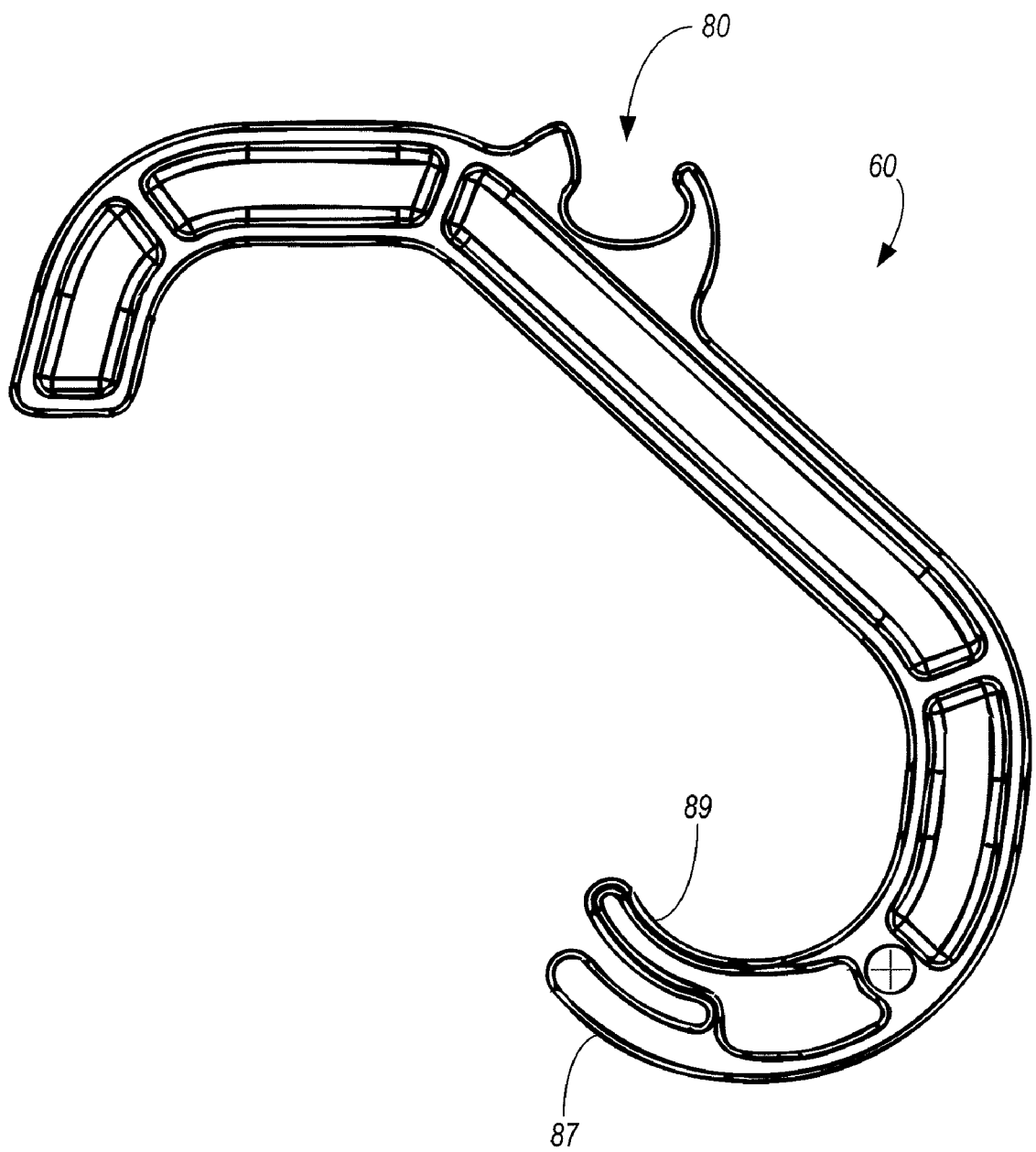
FIG. 4 is a perspective view showing a bracket according to another embodiment of the invention.
Figure 5:
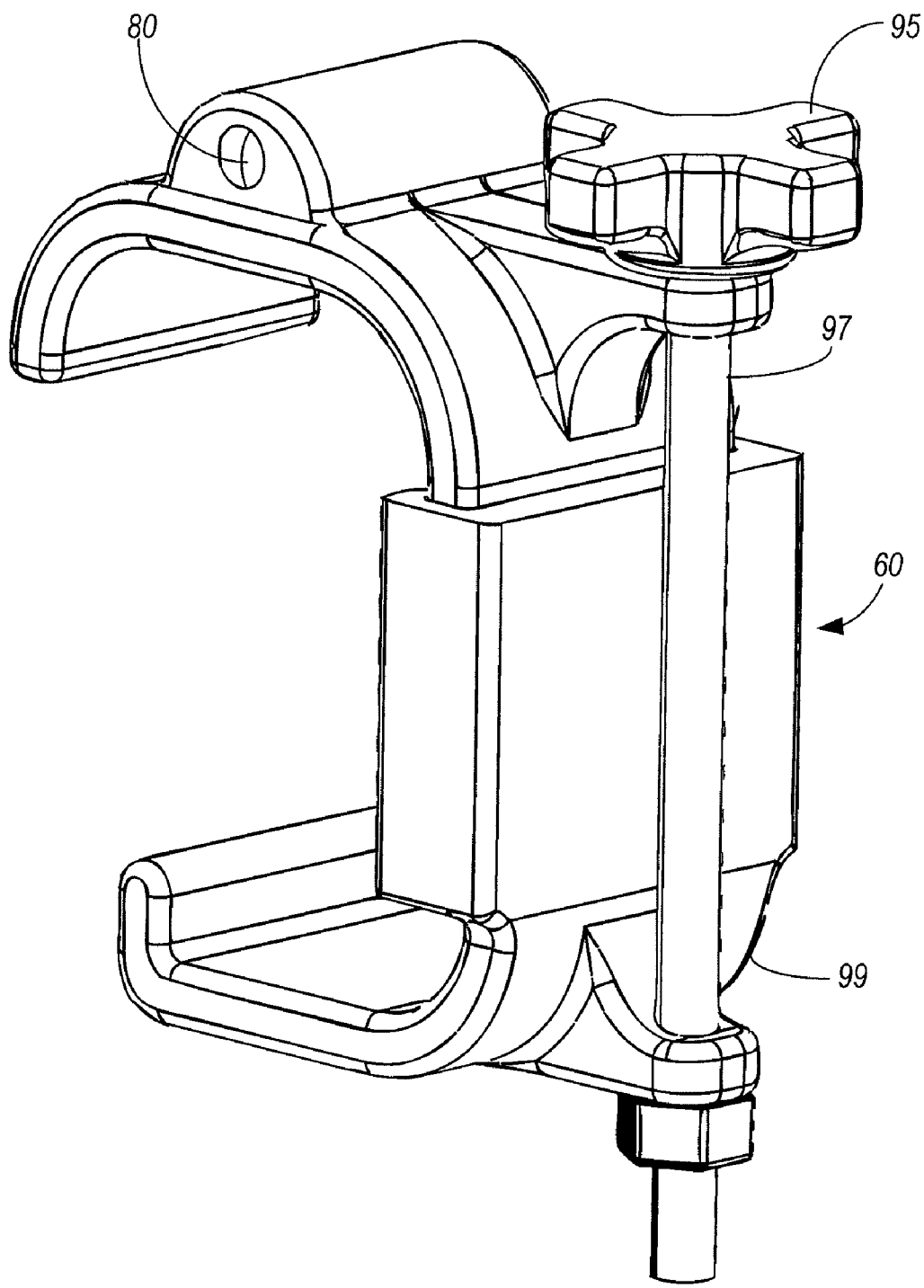
FIG. 5 is a side view showing yet another embodiment of the present invention.

FIGS. 3-5 illustrate a perspective views of various embodiments of brackets 60. As shown, brackets 60 of various sizes, shapes and dimensions are envisioned and the invention is not limited to those depicted. Rather, brackets 60 are envisioned that will correspond to, and fit onto, various sizes and shapes of the roofs 5 and roof profiles 70 of golf carts and the sizes and shapes of brackets 60 are limited only by the sizes and shapes of roof profiles 5 that can be envisioned. Bracket 60 is shaped so that it substantially wraps around the roof 5 of the golf cart and may be shaped to substantially correspond to the profile 70 of the roof. Bracket 60 may attach to the roof 5 by snapping onto the roof 5, by tension or pressure present when the bracket 60 is forced around roof profile 70 or by other methods. In one embodiment of the invention, as shown in FIG. 3 and FIG. 4, once around the profile 70, bracket 60 may be further secured to the roof 5 by set screw 85. As set screw 85 is tightened, the bottom of the screw exits bracket portion 87 and comes to bear against or put pressure on, bracket piece 89. Bracket piece 89 may thus bend inwards in response to this pressure and come to bear tightly, or more tightly, against the bottom of the profile 70 of the roof 5, in addition to the pressure attaching the bracket 60 to the roof 5. A set screw 85 may also be used on the portion of the bracket wrapped around the top of the profile 70 of the roof 5. In another embodiment of the invention, as shown in FIG. 5, a screw 95 connects the top 97 and bottom 99 portions of bracket 60. When the screw 95 is turned, top 97 and bottom 99 portions of bracket 60 are pressed towards each other, thus further tightening the bracket 60 onto roof 5.

Alternative embodiments will become apparent to those skilled in the art to which the invention pertains without departing from its spirit and scope.

That which is claimed is:

1. An apparatus for covering a portion of a rear compartment of a golf cart, and configured for attachment to a roof of a golf cart, the apparatus comprising:
   a stationary frame member;
   at least one movable frame member configured for mounting to the stationary frame member, and further configured to pivotably rotate over a portion of the rear compartment of the golf cart; and
   a cover configured for mounting to the at least one movable frame member so that when the movable frame member rotates over a portion of the rear compartment of the golf cart, the cover covers a portion of the rear compartment of the golf cart,
   wherein the stationary frame member is configured to mount to at least one bracket
   and wherein the at least one bracket is configured to mount to the roof of the golf cart by a snap-fit mechanism.

2. The apparatus of claim 1, wherein the roof has a profile and wherein the shape of the at least one bracket substantially corresponds to the profile of the roof.

3. The apparatus of claim 1, wherein the stationary frame member comprises a U-shaped frame with a horizontal portion and two legs extending relatively perpendicular from the ends of the horizontal portion.

4. The apparatus of claim 3, wherein the horizontal portion of the stationary frame member mounts to the at least one bracket.

5. The apparatus of claim 1, wherein the at least one bracket includes at least one void configured to receive the horizontal portion of the stationary frame member.

6. The apparatus of claim 3, wherein the cross-section of the horizontal portion of the stationary frame member is oval.

7. The apparatus of claim 1, further comprising at least one stabilizing bar.

8. The apparatus of claim 7, wherein the at least one stabilizing bar includes two distally spaced ends, and wherein one end is configured to attach to the golf cart and wherein the other end is configured to attach to the at least one bracket.

9. The apparatus of claim 1, wherein the at least one bracket comprises at least two ends spaced at a distance from each other, and further comprising a set screw secured through at least one end of the bracket.

10. The apparatus of claim 9, wherein at least one end of the bracket comprises a first prong and a second prong spaced at a distance from each other, wherein the set screw is configured to be secured through the first prong, and wherein the set screw is configured to come to bear against and force the second prong towards the roof when it is rotated.

11. The apparatus of claim 1, wherein the at least one bracket is configured to mount to the roof of the golf cart only by the snap fit mechanism.

12. An apparatus for covering a portion of a rear compartment of a golf cart, and configured for attachment to a roof of a golf cart, wherein the roof has a profile, the apparatus comprising:
   a stationary frame member;
   at least one movable frame member configured for mounting to the stationary frame member, and further configured to pivotably rotate over a portion of the rear compartment of the golf cart; and
   a cover configured for mounting to the at least one movable frame member so that when the movable frame member rotates over a portion of the rear compartment of the golf cart, the cover covers a portion of the rear compartment of the golf cart,
   wherein the stationary frame member is configured to mount to at least one bracket,
   and wherein the at least one bracket comprises two opposing ends, is shaped to accept the profile of the roof between the opposing ends, and is configured to attach to the roof of the golf cart by an adjustable clamp.

13. The apparatus of claim 12, wherein the stationary frame member is molded to the at least one bracket.

14. The apparatus of claim 12, wherein the stationary frame member comprises a U-shaped frame with a horizontal portion and two legs extending relatively perpendicular from the ends of the horizontal portion and wherein the horizontal portion of the stationary frame member mounts to the at least one bracket.

15. The apparatus of claim 14, wherein the at least one bracket includes at least one void configured to receive the horizontal portion of the stationary frame member.

16. The apparatus of claim 14, wherein the cross-section of the horizontal portion of the stationary frame member is oval.

17. The apparatus of claim 13, further comprising at least one stabilizing bar.

18. The apparatus of claim 12, wherein the at least one bracket comprises a first portion and a second portion, wherein the first portion and the second portion are spaced at a distance from each other, and further comprising a threaded fastener secured to the bracket at a location near the first portion and secured to bracket at a location near the second portion and wherein the first portion of the bracket is configured to compress closer to the second portion of the bracket when the threaded fastener is tightened.

19. The apparatus of claim 18, wherein the at least one stabilizing bar includes two distally spaced ends, and wherein one end is configured to attach to the golf cart and wherein the other end is configured to attach to the at least one bracket.

20. The apparatus of claim 18, wherein the adjustable clamp is configured to mount to the roof of the golf cart only by force created by the tightening of the threaded fastener.

* * * * *